Aug. 8, 1967 K. W. COWANS 3,334,491

SELF-CONTAINED CRYOGENIC REFRIGERATOR

Original Filed Jan. 18, 1965 3 Sheets-Sheet 1

INVENTOR.
KENNETH W. COWANS,
BY Robert Thompson
ATTORNEY.

INVENTOR.
KENNETH W. COWANS,
BY
Robert Thompson
ATTORNEY.

INVENTOR.
KENNETH W. COWANS,
BY
Robert Thompson
ATTORNEY.

United States Patent Office 3,334,491
Patented Aug. 8, 1967

3,334,491
SELF-CONTAINED CRYOGENIC REFRIGERATOR
Kenneth W. Cowans, Los Angeles, Playa Del Rey, Calif., assignor to Hughes Aircraft Company, Culver City, Calif., a corporation of California
Continuation of application Ser. No. 426,174, Jan. 18, 1965. This application Sept. 14, 1966, Ser. No. 589,154
16 Claims. (Cl. 62—45)

ABSTRACT OF THE DISCLOSURE

The device comprises a self-contained cryogenic refrigerator associated with a condenser which comprises a normally closed refrigerating loop to a heat load. Refrigeration is provided at the condenser and the cryogen in the refrigerating loop is cooled to liquefaction and is transferred via a Leidenfrost transfer technique to a heat load and there evaporated to provide heat load cooling. The cryogen in the refrigerating loop may be drawn from ambient air and exhausted back to atmosphere when the system is turned off. The sealed refrigerator disclosed includes compression and expansion pistons operating in 90° out-of-phase relationship to each other.

This application is a continuation of Kenneth W. Cowans, Ser. No. 426,174, filed Jan. 18, 1965, entitled Self-Contained Cryogenic Refrigerator.

This invention relates generally to cryogenic refrigeration and relates more particularly to an improved closed cycle refrigerator which cools a remote heat load to cryogenic temperatures either continuously or intermitently.

The performance of many critical electronic components can be greatly improved by cooling them to cryogenic temperatures. For example, the performance of infrared detectors and parametric amplifiers is greatly improved by cooling them to low temperatures. Cryogenic cooling of these components in certain field installations, such as airborne equipment, has resulted in the development of several refrigeration systems such as: open cycle thermomechanical systems; and closed cycle thermomechanical systems.

In the prior art open cycle refrigeration systems, a supply of cryogen is stored in a flask, transferred to a heat load, such as an infrared detector, allowed to vaporize in a controlled manner, and then vented to the atmosphere. Thus, improved performance from the heat load is obtained. Once the supply of cryogen is exhausted, the system must be recharged with another supply of liquid cryogen. One example of an open cycle refrigeration system is described in U.S. Patent No. 2,996,893, issued Aug. 22, 1961, to J. G. Goodenough et al.

In the closed cycle cryogenic refrigerator, a reservoir of liquid cryogen is also provided and transferred to a heat load and allowed to vaporize in a controlled manner, thereby providing refrigeration. With these closed cycle systems, however, the expanded gaseous cryogen is reliquefied and fed back to the reservoir for recirculation through the cycle rather than being vented to the atmosphere. One example of a closed cycle cryogenic refrigerator is described in U.S. Patent No. 3,126,711, issued Mar. 31, 1964 to L. E. Miller.

An object of this invention is to provide a device for improved cryogen transfer between a gas liquefier and a heat load.

Another object of this invention is to provide an improved closed cycle cryogenic refrigerator that can be operated continuously or intermittently and which is not operationally affected by being completely turned off for long standby periods between operations.

Still another object of this invention is to provide an improved cryogenic refrigerator employing a closed loop refrigeration cycle and designed to avoid leakage or escape of cryogen.

Still another object of this invention is to provide a lightweight sealed cryogenic refrigerator which is easily maintained and transported.

Yet another object is to provide an improved cryogen transfer arrangement that utilizes atmospheric air as a reservoir of cryogen and which is not affected by contaminants in the atmospheric air.

The above and other objectives of this invention are accomplished by providing a self-contained cryogenic refrigerator transfer arrangement having two closed loops: an inner closed loop which receives the input power and provides refrigeration; and an outer closed loop which utilizes atmospheric air as the cryogen and transfers the refrigeration effect from the inner loop to a heat load.

The inner loop includes an improved gas refrigerator which operates on the Stirling cycle or the Ericsson cycle. The refrigerator includes a compression chamber and an expansion chamber which are operatively formed by a compact folded piston arrangement in which the two pistons operate 90° out of phase with one another and reciprocate along intersecting axes from a common crankshaft. The compression chamber is interconnected with a regenerator of the expansion chamber through a heat exchanger having heat transfer fins so that the heat of compression can be transferred from the refrigerator to a heat transfer medium. The entire gas liquefier is hermetically sealed with only the cold portion being thermally insulated so that the refrigerant is transferred back and forth between the compression chamber and the expansion chamber until the temperature of the refrigerant in the expansion chamber drops to a low level. Preferably, the refrigerant is dropped to a temperature lower than the boiling point of liquid air (77° K. nominal).

The outer loop is connected between the cold expansion chamber of the refrigerator and in thermal transfer association with the heat load. In operation, refrigeration from the refrigerator (inner loop) is transferred to a cryogen in the outer loop through a condenser which liquefies the cryogen of the outer loop. Continuous circulation of this cryogen in the outer loop is accomplished by means of a low pressure compressor which provides a pressure gradient for moving the liquefied cryogen to the heat load and drawing expanded cryogen away from the heat load.

The outer loop utilizes ambient atmosphere for the cryogen. Thus, to compensate for any variation in internal pressure in the outer loop resulting from the substantial volumetric change between liquid cryogen and gaseous cryogen, the outer loop is selectively communicated with the ambient atmosphere (air) through a self-purging filter means, whereby any contaminants in the incoming air are entrapped in the filter. When the internal pressure of the outer loop exceeds a predetermined level, the cryogen (air) is vented back out through the filter. In addition, any impurities previously entrapped in a filter are transferred back to the atmosphere by an automatic purging system when the system is on and the filter is not being used. An advantage of this arrangement is that the atmospheric air is used for a reservoir to supply cryogen, thereby eliminating the need for a cryogen storage vessel.

Transfer of the cryogen between the outer loop and the heat load is accomplished through flexible transfer tube by means of a Leidenfrost technique; that is, droplets of liquid cryogen are formed when the liquid cryogen touches the warm side wall of the tube, thereby providing a boundary layer of cryogen gas which permits friction-free travel of the droplets along the transfer tube without substantial cooling of the transfer tube after the boundary layer is formed. Efficient formation of these droplets is accomplished by means of a heat exchange technique in which the heat of the returning expanded cryogen gas, which is above the boiling point of the liquid cryogen, is transferred to the outgoing droplets, thereby causing the boundary layer to form around the droplets. In addition, cold from the cryogen droplets is transferred to the expanded incoming cryogen, thereby resulting in a more efficient heat transfer operation.

A heat load that may be used with this device includes a Dewar flask having the electronic component positioned at one end thereof. Thus, the incoming cryogen droplets enter the Dewar and cool the electronic components, resulting in a certain amount of the cryogen boiling off. The boiled-off cryogen is transferred back by the compressor in the outer loop, recirculated, and reliquefied by heat transfer from the inner loop gas liquefier. Thus, with the flexible line, a remote heat load which can be gimbaled or moved about its orthogonal axis, can be cooled without moving the self-contained cryogenic refrigerator.

Other objects, features, and advantages of this invention will become apparent upon reading the following detailed description of one embodiment of the invention and referring to the accompanying drawings in which.

Figure 1:
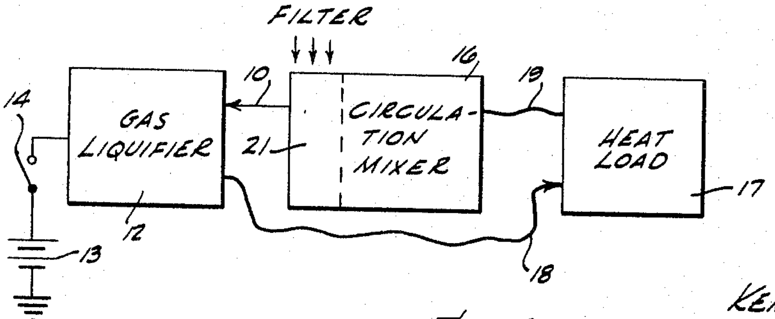
FIGURE 1 is a functional block diagram of the self-contained cryogenic refrigerator system.

Referring now to the drawings, the closed cycle cryogenic refrigerator system is shown in FIG. 1 as a block diagram in order to illustrate the operational relationship between a closed inner loop and a closed outer loop. The closed inner loop includes a refrigerator 12 which is adapted to receive input power, such as electrical energy, from a power source 13 through a switch 14, and to convert the input power to refrigeration energy.

As will be explained in more detail shortly, the outer loop includes a gas liquefier or condenser which is mounted in thermal contact with the cold portion of the refrigerator 12, the latter being hermetically sealed and thermally insulated from the ambient atmosphere. The outer loop also includes a circulator and mixer 16 which continuously circulates a cryogen, such as air, which is obtained from the ambient atmosphere. The cryogen contained in the outer loop is transferred into thermal contact with the cold portion of the gas liquefier 12, where it is liquefied and then transferred in droplet form to a heat load 17 via a transfer line 18. The transfer line 18 may be a thin, flexible line because of a Leidenfrost transfer technique, as will be explained shortly. At the heat load 17, the cryogen droplets collect, absorb heat, and are boiled off in gas form. Thereafter, the gaseous cryogen is withdrawn from the heat load by the circulator via a return transfer line 19. The circulator and mixer 16 includes a conventional low pressure compressor to create a sufficient pressure gradient within the outer loop to provide continuous circulation. The mixer portion of the outer loop includes a filter means 21 which is adapted to provide means for ambient air intake when the internal pressure of the outer loop falls below a predetermined level, and to provide an exhaust path for the gaseous cryogen when the internal pressure in the outer loop exceeds a predetermined level.

Figure 3:
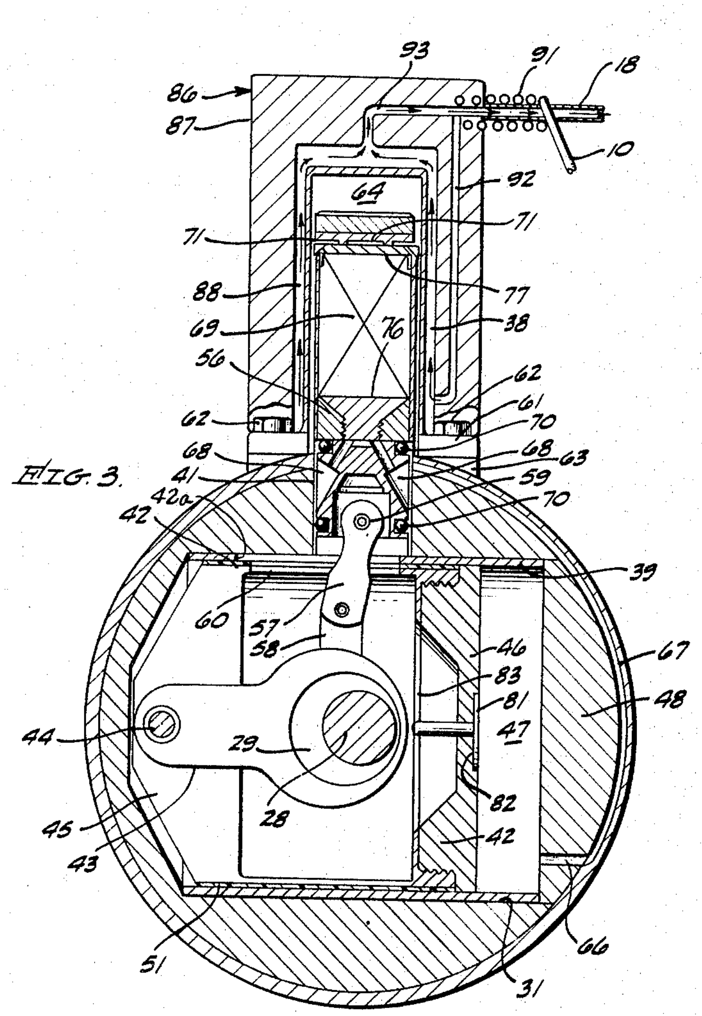
FIG. 3 is a vertical cross-sectional view of the refrigerator showing the physical relationship of the folded pistons to one another and the relationship between the compression chamber and the expansion chamber containing the two pistons.
Figure 2:
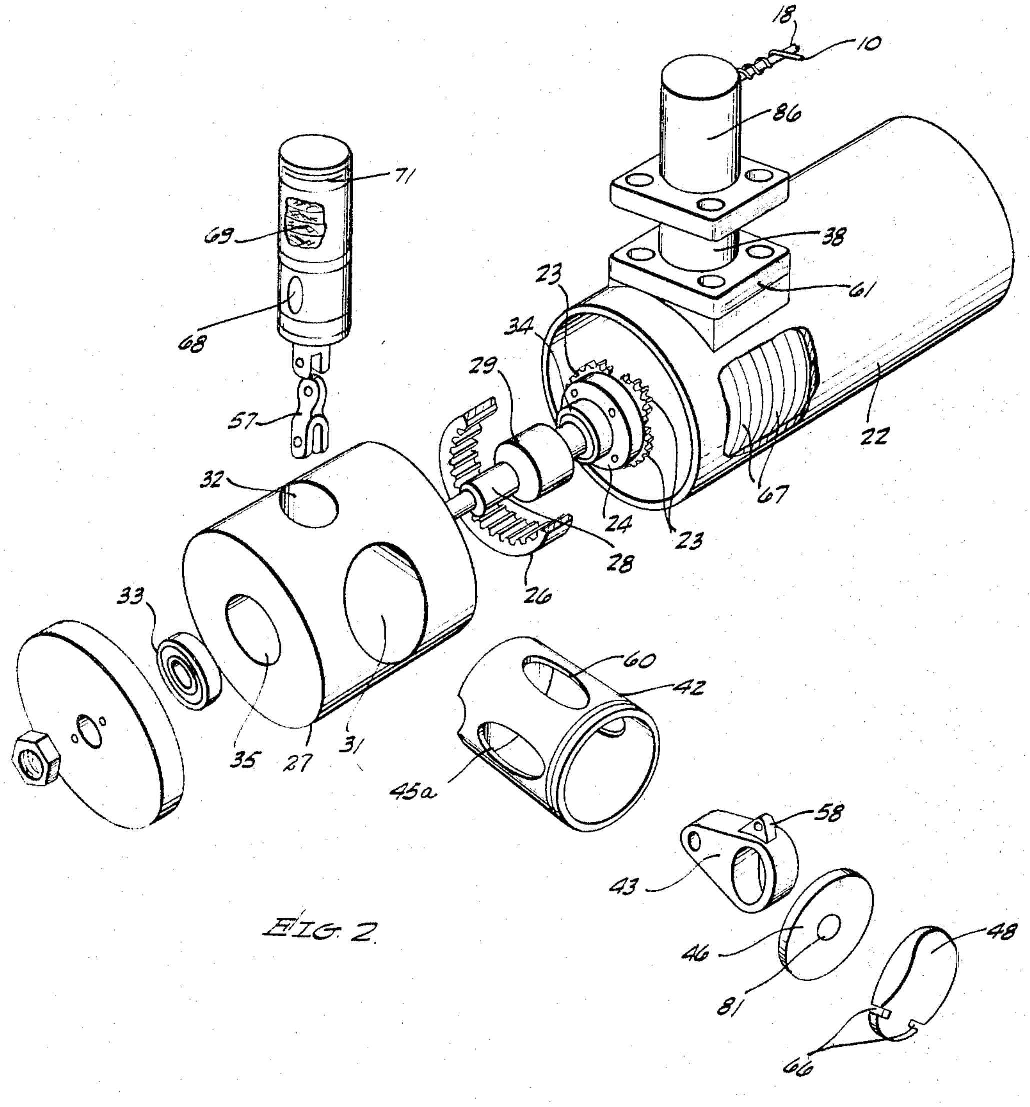
FIG. 2 is a perspective view of the assembly details of the refrigerator containing the inner refrigeration loop.

Referring now to FIGS. 2 and 3 which illustrate the refrigerator 12 in detail. The closed loop refrigerator 12 operates on an Ericsson cycle to produce refrigeration at about 70° K. from a refrigerant such as helium gas at 150 p.s.i.a. Structurally, the refrigerator includes a housing 22 which encloses an electric motor at one end thereof for developing rotational motion along a central axis. The drive shaft of the electric motor projects along the central axis of the housing 22 and drives a single-stage planetary gearset which reduces the motor output shaft rotation speed. Planetary gears 23 are rotatably connected to a flange 24 and inserted into the housing 22 so that they mesh with a sun gear (not shown) on the motor drive shaft. Annular gear 26 is conventionally fixedly mounted for engagement with gears 23. An output drive shaft 28 is thus driven by the rotation of planetary gears 23. The shaft 28 carries eccentric cam 29, the latter, when assembled, being in aligned relation with bones 31 and 32. Roller bearing 33 supports the outboard end of shaft 28. Appropriate closure means are provided. When assembled, the bulkhead 27 is inserted within the outer housing 22 so that the upper cylinder bore 32 is in substantial registry with the axis of a vertically projecting expansion chamber cylinder or housing 38. As illustrated in FIG. 3, the horizontal large diameter cylinder bore 31 has a cylindrical sleeve 39 fitted to line the surface thereof. The vertical, small diameter cylinder bore 32 is also fitted with a sleeve 41 and intersects with the cylinder bore 31 at an aperture **42*a* formed through the upper side wall portion of the horizontally extending sleeve 39**.

Compression and expansion chambers are formed within these cylinder bores by means of a compact folded piston array in which two pistons operate along intersecting axes and 90° out of phase with one another. In operation, as the drive shaft 28 rotates the eccentric 29, a compression chamber piston 42 of a large diameter is reciprocally driven from left to right by means of a connecting rod 43 riding on the eccentric 29 and pivotally connected to a pin 44 extending through the base 45 of the piston 42. The drive shaft 28 extends through apertures **45*a* in the side wall of the piston 42. The piston head 46 defines a variable volume compression chamber 47 which is formed between a cylinder head insert 48 and the sleeve 39. In addition, the piston side wall can be covered with a layer 51** of low-friction material, such as Teflon, to provide for substantially friction-free piston movement.

A variable volume expansion chamber 64 is formed in cylinder 38. The auxiliary connecting rod 57 is pivotally connected at its lower end to a boss 58 formed on the connecting rod 43 and at its upper end to a pivot pin 59 extending radially through the base portion of the expansion chamber piston 56. The connecting rod 57 extends through an aperture 60 formed through the side wall of the large diameter piston. The expansion chamber piston 56 is slidably mounted for vertical reciprocal motion within the expansion chamber cylinder 38. The lower end of the expansion chamber cylinder 38 includes a flange 61 through which suitable mechanical fasteners, such as bolts 62, can be mounted to secure the expansion chamber cylinder to a boss 63 formed on the side wall of the refrigerator housing 22. Thus, as the expansion chamber piston 56 reciprocates, the volume of an expansion chamber 64, formed at the upper end thereof, decreases and increases in accordance with the following operational description of one refrigeration cycle.

The refrigerator illustrated in the drawings is characterized by a four-phase refrigeration cycle including: a compression phase; a first constant pressure phase in which refrigerant is transferred from the compression cylinder chamber 47 to the expansion chamber 64; an expansion phase; and a second constant pressure phase in which the refrigerant is transferred from the expansion chamber to the compression chamber.

As illustrated in FIG. 3, the volume of the compression chamber 47 formed by the large diameter piston 42 is at a maximum volume while the volume of the expansion chamber 64 formed by the small diameter piston 56 is at one-half volume. Considering this piston relationship to be the start of a refregeration cycle then, as the crankshaft 29 is rotated clockwise, the volume of both of the chambers is decreased so that refrigerant contained within the refrigerator undergoes compression and a pressure rise until the small diameter expansion chamber piston 56 just passes beyond top dead center; that is, a compression phase is developed by the refrigerator until the expansion chamber volume starts to increase from substantially zero volume.

Starting from this top-dead-center position, a first constant pressure phase is developed as the small diameter piston 56 moves downward increasing the volume of the expansion chamber 64 and, as the large diameter piston 42 continues to move to the right, decreasing the volume of the compression chamber 47. During this phase, there is a refrigerant flow from the large diameter compression chamber 47 to the small diameter expansion chamber 64 with little or no pressure change occurring in the refrigerant or gas over the following gas path.

The refrigerant in traveling from the compression chamber 47 to the expansion chamber 64 passes: through gas ports 66 formed in the cylinder head 48; through heat exchanger channels 67; to an inlet port 68 in the lower end of the small diameter piston 56; upward through a thermal regenerator 69 located within the piston 56; and out slots 71 into the expansion chamber 64.

As the refrigerant travels through the heat exchanger channels 67 it gives up the heat of compression created during the preceding compression step to ambient atmosphere surrounding the refrigerator housing 22. Structurally, the heat exchanger includes a plurality of circumferentially extending channels 67 formed in parallel rows along the inner wall of the refrigerator housing 22. The circumferentially extending walls between the individual grooves (FIG. 1) increase the heat transfer area and heat transfer efficiency from the refrigerant through the heat-conducting refrigerator housing 22 to ambient.

After the refrigerant leaves the heat exchange channel 67 at about ambient temperature and enters the thermal regenerator 69 it then flows upward to the small diameter expansion chamber 64. During this constant pressure gas transfer the temperature of the refrigerant within the small diameter expansion chamber 64 is colder than the temperature of the gas within the heat exchanger 67. Thus, the refrigerant transfers heat to the regenerator 69 as it flows upward toward the expansion chamber. As a result, the temperature difference between the ends of the regenerator 69 varies evenly with the colder end being adjacent the expansion chamber 64.

Structurally, the gas flow path to the regenerator includes an oblong gas port 68 formed through the side wall of the small diameter piston 56 at a position between the two lower piston seals 70. Thus, as the small diameter piston 56 reciprocates, it is in constant gas communication with the heat exchanger channel 67. The refrigerant entering the gas port 68 travels upward into a lower integrator 76 having a somewhat conical cross section and a plurality of radially projecting slots formed in its outermost portion. Thus, the incoming refrigerant is evenly distributed to the packing of the regenerator 69. The packing of the regenerator can be in the form of stacked screens, steel wool, or the like. The upper end of the small diameter piston encloses an upper integrator 77 which is somewhat disk shaped but still has the same radially projecting slots formed through the outermost portion thereof. The refrigerant escapes from the regenerator packing and the upper integrator through the slots 71 formed in the piston side wall near the piston head and flows into the expansion chamber 64 at substantially the same temperature as the refrigerant already contained in the expansion chamber 64. Because the refrigerant cools in passing from the compression chamber 47 to the expansion chamber 64, the gas pressure does not substantially change since the density of the refrigerant increases sufficiently upon cooling to compensate for any decrease in the refrigerant volume when filling the small diameter chamber from the large diameter chamber.

An expansion phase is initiated as the large diameter piston 42 passes top dead center and the volume of the large diameter compression chamber begins to increase while the volume of the small diameter expansion chamber 64 continues to increase. This increase in the total system volume causes a pressure drop within the system resulting in a transfer of work out of the refrigerant contained in the small diameter expansion chamber 64. This transfer of work out of the refrigerant creates a refrigeration potential within the small diameter expansion chamber 64 which evidences itself by a lowering of the temperature of the refrigerant contained within the expansion chamber 64. Thus, it is then possible to utilize this refrigeration by placing a warmer object in thermal contact with the expansion chamber cylinder 38. Preferably, the wall of the expansion chamber cylinder should be thin and made of an efficient heat conducting material.

As the small diameter piston 56 leaves bottom dead center and starts traveling upward, a second constant pressure phase is initiated as the volume of the expansion chamber 64 starts to decrease and as the volume of the large diameter compression chamber 47 continues to increase. The refrigerant contained within the expansion chamber 64 is transferred back to the compression chamber 47 by way of: the piston slots 71, regenerator 69, the oblong gas ports 68, the heat exchanger channels 67, and the cylinder head ports 66. As the cold refrigerant travels through the regenerator 69, heat is transferred from the packing to the refrigerant so that the temperature of the refrigerant increases uniformly from the top of the regenerator to the bottom of the regenerator. As a result, the temperature in the expansion chamber 64 and at the expansion cylinder 38 is maintained as the cold portion of the refrigerator. When the refrigerant enters the heat exchanger channel 67 it is near ambient temperature and any heat such as is acquired from compression or friction is transferred through the housing 22 to ambient. Eventually, the large diameter piston 42 reaches bottom dead center, thereby returning to the position illustrated in FIG. 3. Thereafter, the above described refrigeration cycle is repeated.

To compensate for any refrigerant leakage between the cylinder walls and the piston seals, the large diameter piston is provided with a normally closed valve 81 positioned in a valve seat 82. A spiral spring 83 is connected to the bore of piston 42 and maintains this valve 81 in a closed position by exerting a small resilient axial force on the valve stem. As a result, any refrigerant entrapped within the crankcase portion of the refrigerator will be transferred back to the expansion-compression portion of the refrigerator when the piston travels to the left to create a gas pressure differential across the piston head sufficient to overcome the bias spring force. The refrigeration developed by the closed cycle refrigerator is used to liquefy a cryogen of ambient fluid contained within an outer closed loop in the following manner. Referring to FIG. 3, a condenser 87 including a thermally insulating housing 86 having a reentrant chamber 88 is mounted over the cold small diameter expansion cylinder 38. Thus, the cold expansion cylinder is the only portion of the refrigerator which is insulated from the ambient atmosphere. An interspace is formed between the outer surface of the expansion cylinder 38 and the inner surface of the reentrant chamber 88 so that gaseous cryogen from the outer loop can be passed upward along the surface of the cold (70° K.) expansion cylinder 38. The thermally insulating housing 87 is fastened to the flange 61 by means of the mechanical fasteners 62, thereby providing a hermetic seal between the interspace and the ambient atmosphere.

Gaseous cryogen enters the condenser 86 through an inlet line 10 which is spiralled about the transfer line 18 to operate as a heat exchanger 91 for transferring heat into the line 18. This heat develops a boundary layer of gas about liquid cryogen droplets within the transfer line 18 for a Leidenfrost transfer while, at the same time, cooling down the incoming gaseous cryogen in the line 10. An advantage of this arrangement is that the Leidenfrost transfer technique is accomplished in an extremely efficient manner while providing for a more efficient liquefaction of the incoming gaseous cryogen.

After the gaseous cryogen leaves the heat exchanger section 91, it flows downward through a passageway 92 extending along one wall of the thermally insulating housing 87, and enters the condenser interspace at the lower end thereof. Because the refrigeration potential developed by the cold expansion cylinder 38 is coldest at the upper end, this gaseous cryogen is liquefied and is transferred to the top end of the interspace at 78° K. nominal for air. This method of cooling the outer loop cryogen reduces the heat flux downward along the material of the expansion cylinder; that is, most of the cold flowing down the cylinder wall is transferred to the gaseous cryogen flowing upward along the wall. The liquid cryogen at the upper end of the interspace is transferred to an outlet passageway 93 and to the thin, flexible transfer line 18. As the liquid cryogen passes through the section of transfer line 18 surrounded by the heat exchanger 91, a thin boundary layer of gaseous cryogen is formed about droplets of cryogen, whereupon the pressure differential developed by the boiled cryogen forces the droplets to travel through the transfer line 18.

Figure 4:
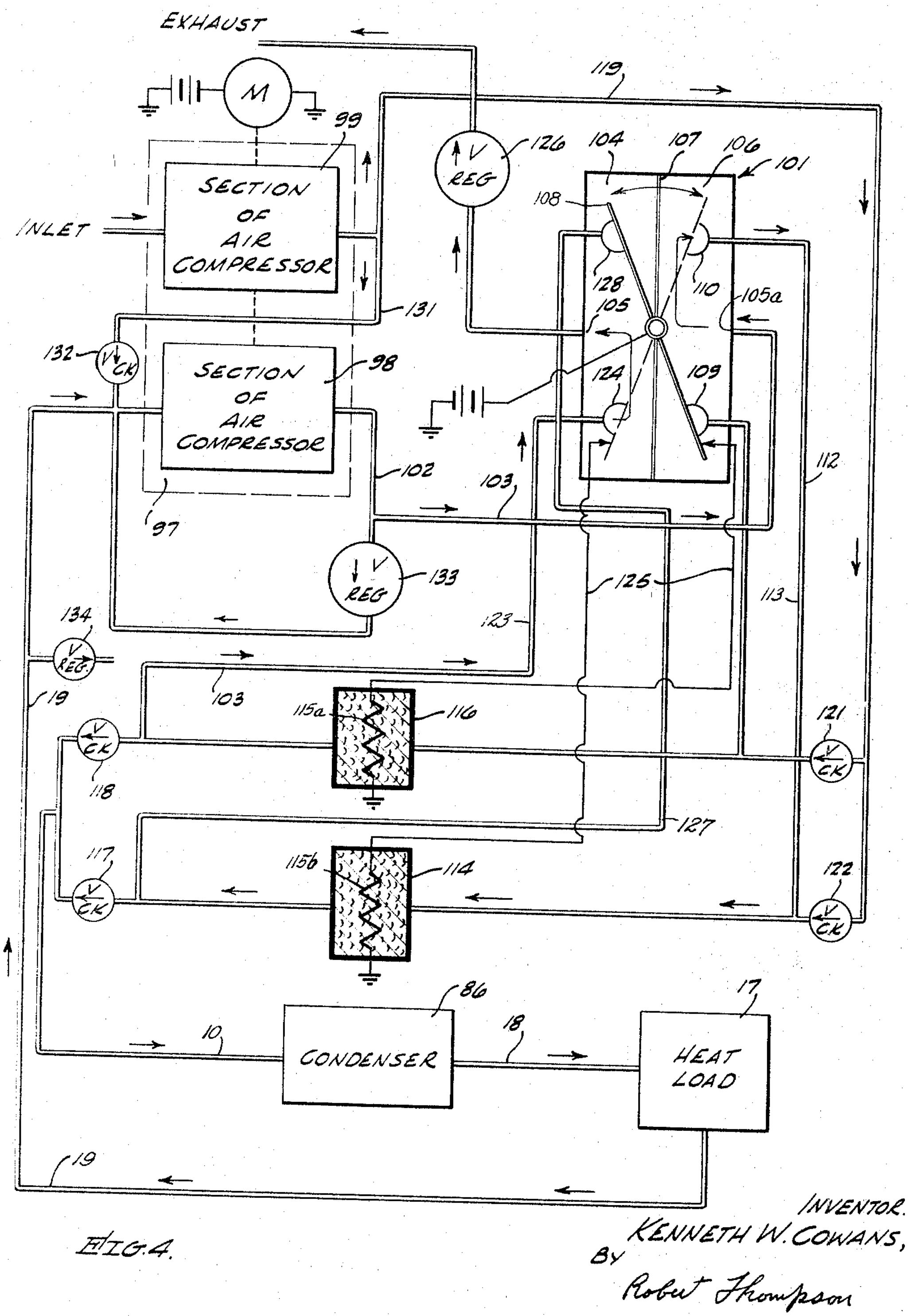
FIG. 4 is a schematic block diagram of the outer loop which is arranged to circulate a cryogen (air) between the refrigerator and a heat load.

In FIG. 4 the above-described condenser 86 is illustrated in schematic form, wherein gaseous cryogen contained within inlet line 10 is fed to the condenser 86 where it is liquefied and transferred in droplet form to a heat load 17 over the transfer line 18. The liquid droplets collect at the heat load 17 and accept heat from a device to be cooled, thereby boiling off a portion of the cryogen and returning it to its gaseous state.

The gaseous cryogen is then returned to a first compressor section 98 of a two-section air compressor 97 over the transfer line 19 for eventual recirculation through a filter means to the condenser 86 and the heat load 17. As will be explained in more detail shortly, a second compressor section 99 draws in ambient atmosphere or air for mixture with the cryogen (ambient atmosphere) already in the outer loop when the internal pressure within the closed loop falls below a predetermined level. It should be understood that this two-section compressor 86 is of any conventional low pressure type that can provide a pressure differential for transferring a portion of the gaseous cryogen from the heat load 17 and recirculating it to the condenser 86 and heat load 17.

In operation, the gaseous cryogen is transferred from the second compressor section 98 to a selector valve 101 over the lines 102 and 103. The selector valve 101 includes two chambers 104 and 106 which are hermetically sealed and thermally insulated from one another by a dividing wall 107. Thus, when a valve plate 108 is in the position illustrated by the solid line representation, it is seated across one exhaust port 109 and unseated from a second exhaust port 110. Thus, the gaseous cryogen enters the chamber 106 at inlet ports 105*a*, and flows out through the exhaust port 110 and a line 112. If, however, the valve plate 108 is pivoted into the position illustrated by the dotted line representation, it would be seated across the exhaust port 110 and unseated from the exhaust port 109. Under these selector valve conditions, gaseous cryogen would flow from the chamber 106 through exhaust port 109 and a line 113 but would not flow through line 112.

Depending upon which of the above described positions the selector valve 101 is in, an absorption filter 114 or an absorption filter 116 will receive the recirculated gaseous cryogen via lines 112 or 113, respectively. The absorption filter will absorb and thereby remove contaminants from the gas and prevent freezing in the condenser 86. To entrap these contaminants, the absorption filters can be packed with any material such as activated charcoal. While the selector valve 101 is in the position illustrated, the absorption filter 114 is receiving the recirculated gas from the selector valve 101 over line 112 and the absorption filter 116 does not receive any recirculated cryogen gas. When, however, the selector valve plate 108 is pivoted to the position represented by the dotted line, the absorption filter 116 receives the recirculated cryogen gas from the selector valve 101 over the line 113 and the absorption filter 114 does not receive any recirculated cryogen gas. The check valves 117 and 118 allow the recirculated cryogen to flow to the condenser 86 and isolate the filters from one another, preventing back flow of recirculated cryogen to the unused filter.

While the selected absorption filter is being utilized to entrap contaminants from the recirculated cryogen, the other absorption filter is being cleaned or purged of any entrapped contaminants by being heated with a resistance heater 115*a* or 115*b*. A flow of ambient atmosphere fluid provides a medium for carrying the melted contaminants from the system. This cleaning of the unused filter is accomplished by pumping ambient atmosphere (air) from the second compressor section 99 and selectively passing the air through the second chamber 104 of the selector valve 101. Air drawn in by the second compressor section 99 is fed over a line 119 to two check valves 121 and 122. If the selector valve 101 is in the position illustrated, the gas pressure on line 112 is sufficient to keep the check valve 122 closed, thereby sealing the gaseous cryogen flowing to filter 114 from the other flow. Since no cryogen is circulating in line 113, the gas pressure in line 113 is quite low allowing the check valve 121 to open and allowing the relatively warm ambient atmosphere fluid to flow through the absorption filter 116. An electrical switch 125 is connected to the selector valve 101 so that heater 115*a* is turned on causing any contaminants entrapped therein to melt and evaporate. The contaminants are then carried by ambient air flow from the filter 116 over a line 123 to the inlet port 124 of the selector valve 101. This contaminated purging air is then exhausted from the selector valve 101 through an exhaust port 105 to the ambient atmosphere through a pressure relief valve 126. If the valve plate 108 is in the second position represented by the dotted line, the check valve 121 will be closed and the check valve 122 will be open by the pressure differential in lines 119 and 112 so that the relatively warm ambient atmosphere flows through the absorption filter 114 to evaporate any contaminants entrapped therein. In this position, the heater 115*b* would be energized by the closure of switch 125 to melt and evaporate entrapped contaminants. The contaminants are then exhausted to the ambient atmosphere over a line 127 to an intake port 128 of the selector valve 101 and through the pressure regulator 126.

When the pressure of the continuously recirculating cryogen contained within the closed loop falls below a predetermined pressure level, ambient atmosphere (air) is fed into the loop. Conversely, when the internal pressure of the recirculated cryogen contained within the closed loop rises above a predetermined level, the cryogen gas is exhausted to the atmosphere. For example, the internal pressure of this closed loop may drop when the system is first turned on as a result of the cryogen gas being liquefied at the condenser 86. In other words, the liquefaction of the cryogen gas substantially reduces the volume, creating a pressure decrease. In addition, a decrease of internal pressure of the closed loop may occur during operation as a result of gas leakage through the fittings.

To compensate for these internal pressure variations within the closed loop, the ambient atmosphere is used as a reservoir for supplying cryogen to the closed loop. The second compressor section 99 draws in ambient atmosphere (air) and feeds it to the closed loop over the line 131 through a check valve 132. Thus, when the pressure within the closed loop controlled by the first compressor section falls below a predetermined level, the check valve 132 opens, thereby allowing ambient air to enter the closed loop. This ambient air is then mixed and circulated with the cryogen (ambient air) already contained in the closed loop.

To regulate the rate at which the cryogen flows through the closed loop, a pressure relief valve or regulator 133 is connected to bypass the first compressor section 98 when the pressure differential thereacross exceeds a predetermined level. The first compressor section 98 operates to circulate the gaseous cryogen to insure that energy lost during refrigeration is transferred back to the closed loop, thereby insuring continuous recirculation of the cryogen.

When the system is turned off, it is possible for the internal pressure of the closed loop to increase as the liquid cryogen warms, boils, and expands. To prevent the thin, flexible lines from bursting because of the internal pressure increase, a pressure relief valve 134 is connected downstream of the heat load 17 to vent the boiled off cryogen to the atmosphere. This does not deplete the supply of cryogen since, as previously stated, the ambient atmosphere is used for a reservoir to supply cryogen to the closed loop. As a result, the operation of the system is not seriously affected by long standby periods in which the system is turned off.

While salient features have been illustrated and described with respect to a particular embodiment, it should be readily apparent that modifications may be made within the spirit and scope of the invention, and it is therefore not desired to limit the invention to the exact details shown and described.

What is claimed is:

1. In a closed cycle cryogenic refrigerator,
a compression chamber,
an expansion chamber,
said chambers having axes in angular relation to each other,
a large diameter piston located in the compression chamber and reciprocally movable therein,
a small diameter piston located in the expansion chamber and reciprocally movable therein,
crankshaft means,
power means to rotate the crankshaft means,
connecting rod means operatively linking the pistons to the crankshaft means,
whereby upon rotation of said crankshaft means said pistons are urged to reciprocally move within said chambers,
passage means interconnecting the compression chamber and expansion chamber to accommodate the transfer therebetween of a cryogen,
said passage means including heat transfer means to accommodate the dissipation of heat from said cryogen as it moves to the expansion chamber,
said pistons being reciprocally movable in out-of-phase relationship to each other whereby the expansion of the cryogen in the expansion chamber produces a substantial temperature fall therein.

2. A closed cycle cryogenic refrigerator according to claim 1,
and including regenerating means in said passage means interposed in series between said dissipating means and said expansion chamber.

3. A closed cycle cryogenic refrigerator according to claim 2,
wherein said crankshaft is located within a crankshaft housing chamber,
and spring-loaded valve means arranged to establish communication between said crankshaft chamber and said compression chamber upon the existence of a predetermined pressure differential therebetween.

4. A closed cycle cryogenic refrigerator according to claim 3,
wherein said pistons reciprocate along the axes in approximately 90° out-of-phase relationship.

5. In a closed cycle arrangement to accommodate transfer of a cryogen fluid liquefied to a cryogenic temperature level from a cryogenic refrigerator to a heat load for evaporation and return,
the combination of condenser means operatively associated with said refrigerator to liquefy the fluid,
line means communicating with the condenser to transfer the liquefied fluid to the heat load and thereby produce a refrigerating effect by boiling to a gaseous condition adjacent to the heat load,
a source of cryogenic fluid outside the closed cycle arrangement,
means accommodating the transfer of fluid from the source to the closed cycle arrangement when the pressure in the latter falls below a predetermined level,
other line means to transfer gaseous fluid from the heat load to the condenser,
said other line means comprising a section having parallel conduits communicating with the condenser,
filter means in each of said conduits,
valve means to selectively direct cryogenic fluid through one of the filters and thence to the condenser,
means to concurrently clean the other filter,
and pump means associated with the line means to induce circulation of the fluid.

6. A closed cycle arrangement according to claim 5,
wherein said source of cryogen fluid is ambient air;
said pump means including a first pump to circulate cryogen fluid within the arrangement to the condenser and heat load;
and a second pump communicating with ambient air and operative to circulate ambient air to said other conduit and thereby clean the other filter;
said valve means including a first valving element to selectively establish communication between one filter, the first pump, said condenser and the heat load.

7. A closed cycle arrangement according to claim 6,
wherein said first valve element concurrently establishes series communication between ambient air, the second pump, the other conduit, the other filter and ambient air.

8. A closed cycle arrangement according to claim 7,
and including,
heating elements in the respective filters which may be energized in response to actuation of said valve element to heat selectively the filters and aid in the cleaning thereof.

9. In a closed cycle arrangement to accommodate transfer of a cryogen fluid to a heat load for evaporation and return,
the combination of a closed cycle refrigerator having a compression chamber and an expansion chamber,
said chambers having axes in angular relation to each other,
a large diameter piston located and reciprocally movable in the compression chamber,
a small diameter piston located and reciprocally movable in the expansion chamber,
a crankshaft chamber having rotatable crankshaft means therein,
power means to rotate the crankshaft means,
connecting rod means operatively linking the pistons and the crankshaft means,
passage means interconnecting the expansion and compression chambers,
whereby upon rotation of the crankshaft means the pistons are urged to reciprocally move in out-of-phase relationship to each other to accommodate the transfer of a refrigerant between the chambers and to induce refrigerant expansion in the expansion chamber and thereby produce a refrigerating effect, condenser means operatively associated with the expansion chamber, a closed loop refrigerant transfer arrangement communicating with the condenser means and having a cryogen therein, said loop including line means establishing communication between the condenser means and the heat load to transfer cryogen liquefied at the condenser means to the heat load, the boiling of said liquefied cryogen to a gaseous condition at the heat load being effective to produce a refrigerating effect at the load, other line means to accommodate transfer of gaseous cryogen from the heat load to the condenser, said other line means including pump means to induce cryogen circulation.

10. A closed cycle arrangement according to claim 9, wherein said other line means are arranged in heat exchange relation with the first-mentioned line means.

11. In a closed loop arrangement to transfer a liquid cryogen fluid to a heat load for evaporation and cooling of the heat load and return, the combination of a closed cycle refrigerator having both a relatively large volume compression chamber and a relatively small volume expansion chamber, the respective chambers having a first piston and a second piston reciprocally movable therein, a crankshaft chamber having crankshaft means rotatable therein, connecting rod means linking said pistons and the crankshaft means to induce piston reciprocation upon crankshaft rotation whereby the pistons reciprocate in out-of-phase relationship to each other, said closed cycle refrigerator including passage means extending between the chambers, said chambers and said passage means having a refrigerant therein, the refrigerant being transferred between the chambers via the passage means in response to piston reciprocation and thereby produce a refrigerating effect, condenser means forming part of the closed loop arrangement thermally associated with the expansion chamber, said closed loop arrangement including a first line establishing communication between the condenser means and the heat load, other line means establishing communication between the load and condenser and including pump means to induce circulation through said closed loop, said cryogen fluid being disposed in said loop and independent of the refrigerant in said chambers and said passage means, said cryogen fluid being liquefied at the condenser means by said refrigerating effect, and means to induce evaporation of a portion of said liquefied cryogen fluid whereby droplets of liquefied cryogen are entrained in evaporated cryogen fluid and move through the first line means between the condenser means and the heat load, the boiling of said liquefied cryogen fluid to a gaseous condition at the heat load being effective to produce a cooling effect at the load.

12. A closed loop arrangement to transfer a liquid cryogen fluid to a heat load for evaporation and cooling of the load and return according to claim 11, and including a source of cryogen fluid normally independent of the fluid disposed in the closed loop and, means to establish communication between said source and said closed system to add cryogen fluid to the closed system when the pressure in the latter falls below a predetermined level.

13. A closed loop arrangement to transfer a liquid cryogen fluid to a heat load for evaporation and cooling of the load and return, according to claim 12, wherein said cryogen fluid is air.

14. A closed loop arrangement to transfer a liquid cryogen fluid to a heat load for evaporation and cooling of the load and return, according to claim 13, wherein said other line means encircles said first line means and establishes a heat transfer relation therebetween to induce said evaporation of said portion of said liquefied cryogen fluid.

15. In a closed loop arrangement operative to transfer liquefied cryogen fluid from a condenser associated with a cryogenic refrigerator and to a heat load for evaporation and thereby cooling of the load and return, said condenser being operative to liquefy the cryogen fluid in said closed loop arrangement, first line means forming part of the arrangement and establishing communication between the condenser and the heat load, means associated with the condenser and first line means to provide an evaporated portion of said liquefied fluid to create a dispersion of liquefied cryogen fluid droplets within said gaseous cryogen fluid, other line means forming part of said closed loop arrangement establishing communication between the heat load and said condenser means, said other line means including pump means to induce circulation of said cryogen fluid in said closed loop arrangement whereby the droplets of liquefied cryogen fluid entrained in gaseous cryogen fluid are transferred from the condenser means to the heat load, said liquefied droplets of cryogen fluid evaporating at the heat load to there produce a refrigerating effect, a source of cryogen fluid normally non-communicating with the closed loop arrangement, and control means interconnecting said source and said closed loop arrangement to establish communication and accommodate transfer of cryogen fluid from said source to said closed loop arrangement when the pressure level in said arrangement falls below a determined point.

16. A closed loop arrangement operative to transfer liquefied cryogen fluid from a condenser associated with a cryogenic refrigerator to a heat load for evaporation and thereby cooling the load and return according to claim 15, wherein said cryogen fluid is air, said non-communicating source comprising air under pressure and having a pressure level greater than that existent in the closed loop arrangement.

References Cited

UNITED STATES PATENTS

| | | | |
|---|---|---|---|
| 966,076 | 8/1910 | Bobrick | 62—239 |
| 3,036,440 | 5/1962 | Feinman | 62—64 |
| 3,125,863 | 3/1964 | Hood | 62—175 |
| 3,182,462 | 5/1965 | Long et al. | 62—55 |
| 3,195,322 | 7/1965 | London | 62—514 |

LLOYD L. KING, *Primary Examiner*.